UNITED STATES PATENT OFFICE.

RICHARD HEYDER, OF NEW YORK, N. Y., ASSIGNOR TO GENERAL ELECTRIC COMPANY, A CORPORATION OF NEW YORK.

MANUFACTURE OF BORON NITRID.

1,077,712.     Specification of Letters Patent.     Patented Nov. 4, 1913.

No Drawing.     Application filed April 2, 1912. Serial No. 688,037.

*To all whom it may concern:*

Be it known that I, RICHARD HEYDER, residing at New York, county of New York, State of New York, have invented certain new and useful Improvements in the Manufacture of Boron Nitrid, of which the following is a specification.

My invention comprises a process of making boron nitrid.

In accordance with my invention a mixture of a reducible boron compound and an active reducing agent, such as metallic magnesium and a decomposable nitrogen compound is heated to the reaction temperature.

According to one method of carrying out my invention, finely ground boric anhydrid, $B_2O_3$, is mixed with finely divided magnesium and an ammonium salt, for example, the chlorid. The proportions giving the best yield are two parts of boric anhydrid, one part of magnesium and three parts of ammonium chlorid. The mixture is placed in fire clay, or other suitable crucible and heated in a gas furnace to the reaction temperature which is below dull red heat, about 300° C. The reaction is accompanied by an evolution of considerable heat which raises the temperature of the mass to about 800° C.

The product of the reaction is a white mass consisting of boron nitrid, magnesium oxid, magnesium borate and magnesium chlorid. The magnesium chlorid, magnesium oxid and magnesium borate are removed by washing with dilute sulfuric acid. The boron nitrid obtained by filtration is carefully freed from the excess of water and dried *in vacuo* at as low a temperature as possible, say 60–70° C. Washing with alcohol to remove the water before final drying is useful as the last escaping portions of the water are apt to cause some decomposition of the boron nitrid and contamination with boric acid.

What I claim as new and desire to secure by Letters Patent of the United States, is:—

1. The method of producing boron nitrid comprising the step of subjecting a mixture of a reducible boron compound, a reducing metal and decomposable nitrogen compound to the reaction temperature.

2. The method of producing boron nitrid comprising the step of subjecting a mixture of boric anhydrid, magnesium and ammonium chlorid to the reaction temperature.

3. The method of producing pure boron nitrid which consists in subjecting a mixture of boric anhydrid, magnesium and an ammonium compound to a temperature sufficient to initiate the reaction, and after completion of said reaction, cooling, and washing the resulting product with dilute acid.

4. The method of producing pure boron nitrid which consists in subjecting a reducible boron material, magnesium, and an ammonium compound to a temperature of about 300° C. to initiate a reaction, after completion of said reaction, cooling, and washing the resulting product successively with dilute acid and alcohol and drying at a low temperature *in vacuo*.

5. The method of producing boron nitrid which consists in subjecting a mixture of a reducible boron compound, a reducing metal and ammonium chlorid to the reaction temperature, after completion of the reaction, cooling and washing with a solvent for the by-products of the reaction, and finally drying the boron nitrid *in vacuo* at a temperature of about 60–70 degrees C.

In witness whereof, I have hereunto set my hand this 28 day of March 1912.

RICHARD HEYDER.

Witnesses:
  MAURICE HERZOG,
  HARRY L. HERZOG.

---

Copies of this patent may be obtained for five cents each, by addressing the "Commissioner of Patents, Washington, D. C."